Figure 1:
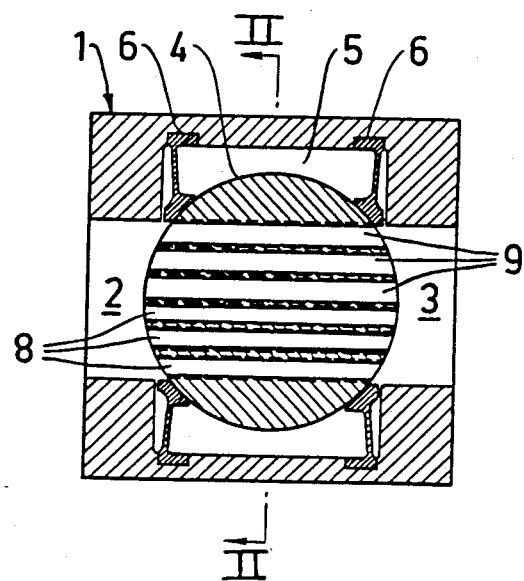

United States Patent [19]
Engelbertsson

[11] Patent Number: 4,889,163
[45] Date of Patent: Dec. 26, 1989

[54] VALVE ASSEMBLY
[75] Inventor: Karl-Magnus Engelbertsson, Danderyd, Sweden
[73] Assignee: AB Tore J Hedback, Danderyd, Sweden
[21] Appl. No.: 204,428
[22] PCT Filed: Feb. 5, 1987
[86] PCT No.: PCT/SE87/00054
§ 371 Date: Apr. 22, 1988
§ 102(e) Date: Apr. 22, 1988
[87] PCT Pub. No.: WO88/05880
PCT Pub. Date: Aug. 11, 1988
[51] Int. Cl.⁴ .............................................. F16K 47/02
[52] U.S. Cl. ................................ 137/625.32; 251/127
[58] Field of Search ...................... 137/625.31, 625.32; 251/127

[56] References Cited
U.S. PATENT DOCUMENTS
4,364,415 12/1982 Polon ............................ 137/625.32
4,402,485 9/1983 Fagerlund ...................... 251/127 X
4,540,025 9/1985 Ledeen et al. ................. 137/625.32
4,693,450 9/1987 Paetzel ........................... 251/127

FOREIGN PATENT DOCUMENTS
0166375 1/1986 European Pat. Off.
2352370 4/1975 Fed. Rep. of Germany ....................... 137/625.32

Primary Examiner—Arnold Rosenthal
Attorney, Agent, or Firm—Rosen, Dainow & Jacobs

[57] ABSTRACT

The invention relates to a valve assembly for adjusting a fluid flow comprising a housing (1) provided with an inlet (2) and an outlet (3) for fluid and a spherical body (4) rotatably arranged in the valve housing (1) between the inlet and outlet (2, 3) and mounted sealingly against the valve housing (1), the valve body being provided with fluid flow passages (8–10; 14, 15), and an annular space (5) formed between the valve housing (1) and the valve body (4), the flow passages (8–10; 14, 15) ending in the space (5) when the valve is closed and in the inlet and outlet (2, 3) when the valve is fully open. A reduced risk of cavitation and a high sound level in high pressure conditions are obtained by the invention.

7 Claims, 3 Drawing Sheets

VALVE ASSEMBLY

This invention relates to a valve assembly comprising a housing provided with an inlet and an outlet for fluid and a spherical body rotatably arranged in the valve housing between the inlet and outlet and mounted sealingly against said valve housing, said valve body being provided with fluid flow passages.

For adjusting a fluid flow, conventional ball valves comprising two throttles in series with a fixed volume enclosed between said throttles have been found to be suitable. However, in high pressure conditions high flow rates are created at these throttles depending on small cross-sections of an inconsiderable extension in the direction of flow which may cause cavitation and a high sound level. The most critical movement in adjustment is when the first passageway especially at the outlet side, opens. In this position the fluid flow should offer a high flow resistance also at low flow volumes.

It is the object of the invention to provide a simple and, at the same time, efficient device for adjusting a fluid flow where disadvantages of cavitation and a high sound level are avoided.

For this purpose a device having the characteristic features defined in the claims is suggested according to the invention.

Figure 2:
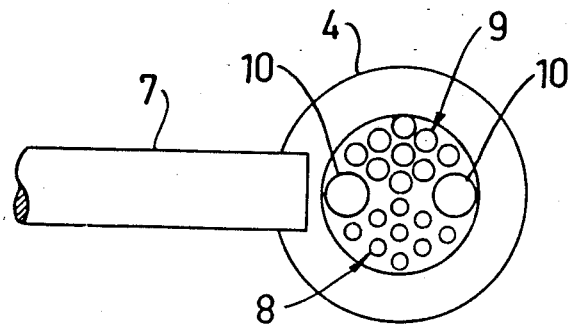
Figure 3:
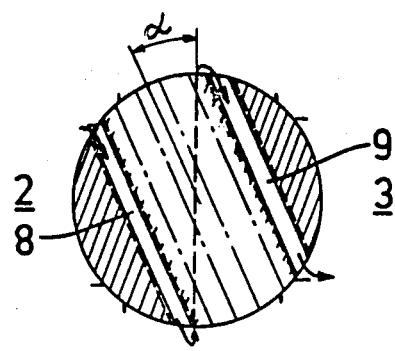
Figure 4:
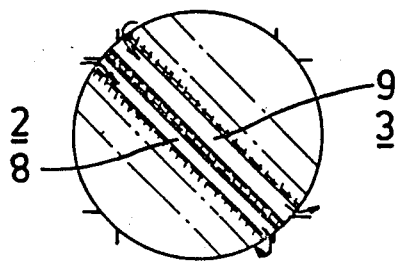
Figure 5:
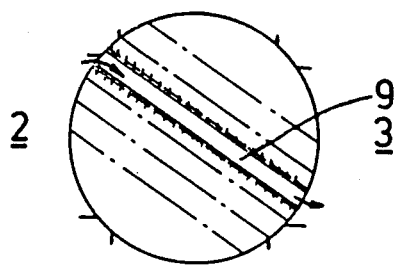
Figure 6:
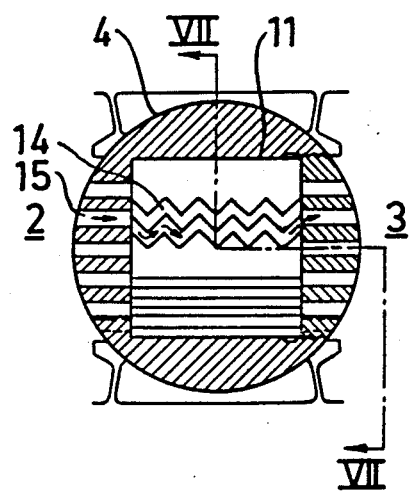
Figure 7:
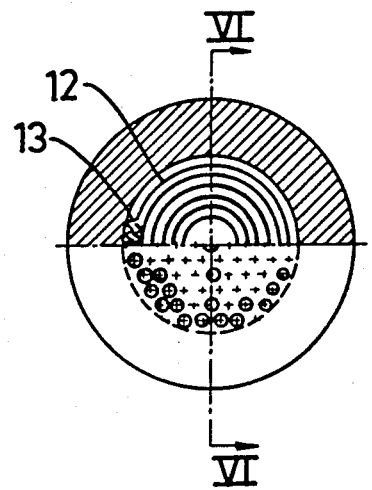

The invention is described in greater detail in the form of non-limiting examples with reference to the enclosed drawings, wherein FIG. 1 shows a longitudinal section of a valve according to a first embodiment of the invention, FIG. 2 shows the valve body according to the section II—II in FIG. 1, FIG. 3 shows a longitudinal section of the valve body with an opening angle $\alpha = 25°$, FIG. 4 shows a section corresponding to FIG. 3 but with the opening angle $\alpha = 45°$, FIG. 5 shows also a section corresponding to FIG. 3 with the opening angle $\alpha = 56$, FIG. 6 shows a section according to VI—VI in FIG. 7 of a second embodiment of the valve, and FIG. 7 shows the valve according to the section VII—VII in FIG. 6.

With reference to FIG. 1 the ball valve comprises a valve housing 1 provided with an inlet 2 and outlet 3 and a spherical valve body 4 rotatably arranged in the valve housing 1. The valve body 4 is sealingly mounted against an annular space 5 formed in the valve housing 1 by means of two valve seat rings 6. The valve seat rings 6 are fixedly connected to the valve housing 1 by their outer peripheries and have a clearance to the valve housing 1 at their inner peripheries in order to allow a resilient motion of the valve body 4.

The valve body 4 (FIGS. 1, 2) is rotatable by means of a push rod 7 fixedly connected to the valve body 4 and is provided with two groups of passing flow passages 8, 9. The flow passages 8, 9 with circular cross-sections are preferably grooved in the transversal direction, for example by threads. The groups of passages 8, 9 are arranged on both sides of the horizontal diametrical plane in FIG. 1, the passages 8 having a smaller diameter than the passages 9. The valve body 4 further comprises two smooth flow passages 10 of a larger diameter arranged in said plane. When the valve is closed all the passages end in the space 5. On the other hand, when the valve is open the passages end in the inlet and outlet 2, 3, as is apparent from FIG. 1.

The mode of operation of the valve will be described with the aid of FIGS. 3–5, where FIG. 3 shows the valve body with the opening angle $\alpha = 25°$. In this case only a few of passages 8 and 9, respectively, are opened. The substantial fluid flow path is marked by arrows. Thus, the fluid flows through a first throttle position in the form of passages 8 into the annular space 5 and around half the periphery in order to thereafter flow out through a second throttle in the form of passages 9. The passages 8 have a small diameter which causes a high flow resistance and consequently a large drop in pressure. The grooves of the passages cause a greater flow resistance and larger drop in pressure simultaneously with a lower flow rate. The above also applies to the passages 9, which, however, have a somewhat larger diameter in order to reduce the flow rate and the pressure drop, the risk of cavitation being reduced.

FIG. 4 shows the valve body 4 with the opening angle $\alpha = 45°$, all the passages 8 being opened and ending in the inlet 2 and the space 5 and all the passages 9 also being opened but ending in the space 5 and the outlet 3. This means that full flow with maximum pressure drop can pass the valve.

When the valve is opened more than 45° (FIG. 5) a part of the fluid can flow directly from the inlet to the outlet, this part of the fluid flow increasing with increasing valve opening. At the same time the passages 10 are opened for a direct fluid flow from the inlet 2 to the outlet 3 which reduces the pressure drop across the valve.

Thus, when the valve is opened from 0° to 45° the flow will increase to its maximum maintaining a high pressure drop. With continued opening of the valve the pressure drop is successively reduced to a minimum at an opening of 90° when a direct flow is reached in all the passages.

In FIGS. 6–7 another embodiment of the invention is shown where the valve body 4 is turned out and provided with a cylindrical insert 11. The insert 11 comprises a number of concentric, spaced apart, tubular members 12 with corrugated insert members 13 placed in the interspaces. In this way zigzagged flow passages 14 are formed which are in fluid connection with flow passages 15 of a circular cross-section arranged in the valve body 4. The fluid connection is preferably formed so that each flow passage 15 can end in two separate passages 14.

The mode of operation of the valve described in connection with FIGS. 1–5 applies to the embodiment of FIGS. 6–7 which enables a still higher pressure drop without any risk of cavitation.

Of course modifications of the valve assembly are possible within the scope of the invention. Thus, the number, size and location of the passages can for example be varied in different ways depending on which adjusting characteristic is desired. The passages can further be made conical with a cross-section increasing towards the outlet.

I claim:

1. A valve assembly comprising a housing having an inlet and an outlet for fluid and a spherical valve body rotatably disposed in said valve housing between said inlet and said outlet for selectively sealing and communicating said inlet and said outlet, said valve body having a plurality of first passages therethrough and a plurality of second passages therethrough, said first passages being disposed on one side of a plane in the axis of rotation of said valve body and said second passages being disposed on the other side of said plane, said second passages being larger in cross section than said first passages, there being an annular space between said valve housing and said valve body, said first and second flow passages opening in said space when said valve is fully closed and opening in said inlet and said outlet when said valve is fully opened, said first flow passages opening in said space and in said inlet and said second passages opening in said space and in said outlet when said valve is partially opened.

2. A valve assembly as claimed in claim 1 wherein said first and second passages are grooved in a transverse direction to increase flow resistance.

3. A valve assembly as claimed in claim 1 including two third passages having a substantially larger cross section than those of said first and second passages, said third passages being disposed diametrically opposed in said plane.

4. A valve assembly as claimed in claim 1 wherein the first and second passages have a circular cross section.

5. A valve assembly as claimed in claim 1 wherein said first and second passages have cross-sectional sizes and are positioned such that in a first partially opened condition of said valve assembly a single first passage opens in said inlet and a single second passage opens in said outlet and such that in a second partially opened condition of said valve assembly a plurality of first passages open in said space and in said outlet and a plurality of second passages open in said space and in said outlet.

6. A valve assembly as claimed in claim 1 wherein said valve body has a cylindrical cavity therein in which is disposed an insert which defines zigzagged passages in fluid communication with said first and second passages.

7. A valve assembly as claimed in claim 1 wherein said insert comprises concentric, tubular, spaced apart members with corrugated insert elements disposed in interspaces thereof.

* * * * *